(12) United States Patent
Hoffman

(10) Patent No.: US 6,863,207 B2
(45) Date of Patent: Mar. 8, 2005

(54) SYSTEM FOR HIGH SPEED CENTRIFUGAL WELDING

(75) Inventor: Steve E. Hoffman, Englewood Cliffs, NJ (US)

(73) Assignee: Mikronite Technologies Group Inc., Carlstadt, NJ (US)

( * ) Notice: Subject to any disclaimer, the term of this patent is extended or adjusted under 35 U.S.C. 154(b) by 569 days.

(21) Appl. No.: 09/965,544

(22) Filed: Sep. 27, 2001

(65) Prior Publication Data

US 2003/0060136 A1 Mar. 27, 2003

(51) Int. Cl.[7] .......................... B23K 20/12; B23K 37/00
(52) U.S. Cl. ...................... 228/2.3; 228/48; 228/114.5; 451/41
(58) Field of Search ...................... 228/48, 49.2, 2.3, 228/2.1, 113, 114, 114.5, 218, 221, 23; 451/41

(56) References Cited

U.S. PATENT DOCUMENTS

| | | | |
|---|---|---|---|
| 3,233,372 A | 2/1966 | Kobayashi | |
| 3,513,604 A | 5/1970 | Matsunaga | |
| 4,073,095 A | 2/1978 | Dreher | |
| 4,553,690 A * | 11/1985 | Nakamura | 29/894 |
| 4,586,292 A | 5/1986 | Carroll et al. | |
| 4,967,514 A | 11/1990 | Kunz | |
| 5,140,783 A | 8/1992 | Hoffman | 51/313 |
| 5,295,330 A | 3/1994 | Hoffman | 51/163 |
| 5,355,638 A | 10/1994 | Hoffman | 451/32 |
| 5,454,749 A | 10/1995 | Ohno | |
| 5,507,685 A | 4/1996 | Hoffman | 451/34 |
| 5,848,929 A * | 12/1998 | Hoffman | 451/32 |
| 6,536,089 B1 * | 3/2003 | Komiya et al. | 29/455.1 |
| 6,599,176 B2 * | 7/2003 | Hoffman | 451/326 |

* cited by examiner

Primary Examiner—Lynne R. Edmondson
(74) Attorney, Agent, or Firm—Drinker Biddle & Reath LLP (57) ABSTRACT

An apparatus is disclosed for performing high speed welding of two or more materials. The apparatus includes an outer vessel having an inner surface and a central axis. At least one inner vessel is positioned within the outer vessel and adapted to receive at least two materials to be subjected to a bonding or welding process. A drive system causes the inner vessel to rotate with respect to the outer vessel. The apparatus is designed to inhibit the formation of an oxidation layer on the materials during rotation. In one embodiment, the oxidation layer is inhibited by creating a vacuum within the inner vessel. In another embodiment, the inner vessel is filled with a gas which inhibits formation of an oxide layer on the materials. A method for high speed welding is also disclosed.

26 Claims, 10 Drawing Sheets

SYSTEM FOR HIGH SPEED CENTRIFUGAL WELDING

FIELD OF THE INVENTION

The present invention relates to an apparatus for providing material processing, and more particularly, for providing a high speed centrifugal bonding of materials.

BACKGROUND OF THE INVENTION

Numerous strides have been made in recent years in the field of high speed material processing, including the development of apparatus and processes for providing high speed centrifugal finishing. One such device is disclosed in U.S. Pat. No. 5,355,638 which is incorporated herein by reference in its entirety. The centrifugal finisher disclosed in U.S. Pat. No. 5,355,638 has an outer vessel that is rotatable, and at least one inner vessel located within the outer vessel and which is revolved around the inside surface of the outer vessel while concomitantly rotating about its own axis. A traction surface exists between the inside surface of the outer vessel and the outside surface of the inner vessel. The traction surface allows the outer vessel to restrain the inner vessel while the inner vessel experiences centrifugal forces.

The rotational movement of the inner vessel that is generated in this machine simultaneously transfers momentum from the outer vessel to the inner vessel since the outer vessel is rotated at a different speed and potentially a different direction than the rotational movement of the inner vessel. The resulting motion on the inner vessel is transferred to articles and finishing media contained within the inner vessel, providing high speed polishing of the articles.

An improved device is disclosed in U.S. Pat. No. 5,848,929 which is incorporated herein by reference in its entirety. The apparatus disclosed in U.S. Pat. No. 5,848,929 includes a fixed outer vessel, an inner vessel for containing the item to be finished, and one or more intermediate rollers. A drive system rotates the inner vessels and/or the intermediate rollers around the central axis of the outer vessel. The contact between inner vessel and the intermediate rollers causes the inner vessel to also rotate about its own axis, thereby subjecting the contents of the inner vessel to both centrifugal and rotation motion.

The speeds at which these prior art devices operate are extremely high. In particular, the device shown in U.S. Pat. No. 5,848,929 is currently in operation and has attained speeds which subject the objects being finished to accelerations in excess of 120 g's. These high speeds are very beneficial in a finishing process since they permit the finishing media used to perform efficient finishing of the surface area.

The inventor of the present invention has determined that the high speeds provided by the finishing apparatus discussed above could also be beneficial in other material processing operations. In particular, it has been determined that current welding operations can be improved with the use of high speed centrifugal processing. For example, the high forces generated by a centrifugal apparatus can be combined with a vacuum environment to produce welding of materials. One example is the mixing of cobalt malt with tungsten carbide which is used to make inserts for tools. Currently, this combination can only be achieved when subjected to high temperatures and high pressure. The machinery necessary to produce sufficiently high temperatures and pressure are extremely expensive and the process is relatively time consuming.

A need exists for an improved apparatus and process for providing high speed welding.

SUMMARY OF THE INVENTION

The present invention relates to a high speed centrifugal device which uses the force generated by high speeds to bond two materials together. The device includes an outer vessel having an inner surface and a central axis. At least one inner vessel is positioned within the outer vessel and adapted to receive at least two materials to be subjected to a bonding process. A drive system causes the inner vessel to rotate with respect to the outer vessel.

The device also includes components which are designed to inhibit the formation of an oxidation layer on the materials during rotation. In one embodiment the oxidation layer is inhibited by creating a vacuum within the inner vessel. This is achieved by connecting a vacuum to the device such that negative pressure is created within the inner vessel.

In another embodiment, the inner vessel is filled with a gas which inhibits formation of an oxide layer on the materials. Examples of suitable gases include argon and silicon dioxide The gas may be argon or hydrogen gas.

A method for high speed bonding is also disclosed.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

Figure 1:
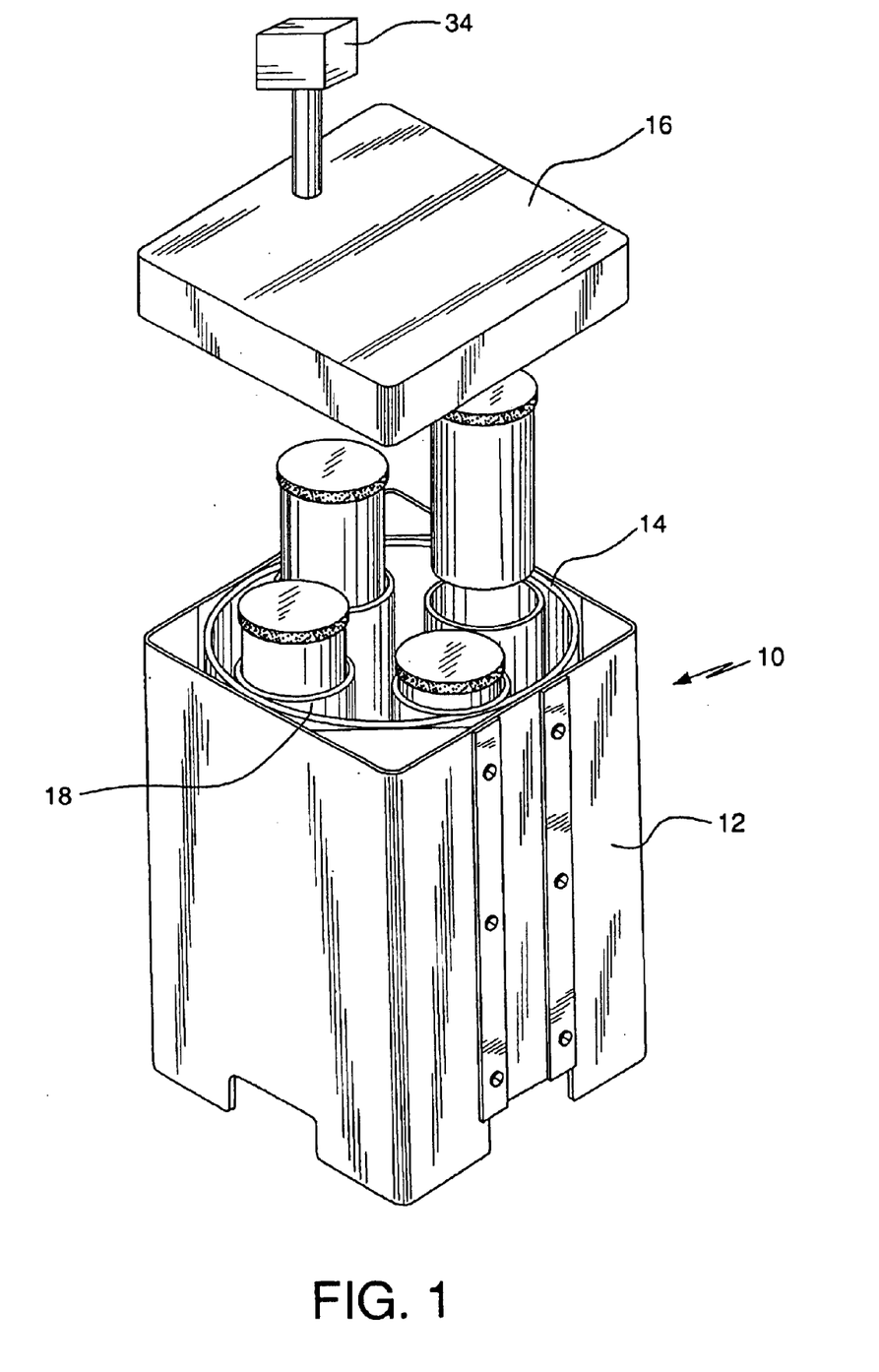
FIG. 1 is a perspective view showing one embodiment of an apparatus according to the present invention which produces welding through the use of high speed centrifugal and rotational motion in a vacuum environment.

Referring now to the drawings, wherein like reference numerals illustrate corresponding or similar elements throughout the several views, FIG. 1 is a perspective view of one embodiment of the high speed centrifugal apparatus 10 according to the present invention. The apparatus in this embodiment of the invention is similar to the device disclosed in U.S. Pat. No. 5,355,638, which has been incorporated herein by reference in its entirety. The apparatus 10 includes a housing 12 which encloses and/or supports an outer vessel 14 in any conventional manner. As will be apparent from the discussion below, the outer vessel 14 may be mounted so that it is rotatable within the housing 12. Alternately, the outer vessel 14 may be fixed to the housing 12 and/or the ground. The outer vessel 14 is preferably made from high strength material, such as steel, to accommodate the high loads under which it will operate.

A cover 16 is preferably removably or hingedly mounted to the housing 12 so as to permit access to the outer vessel 14 contained therein. The housing 12 and cover 16 are preferably made from material that is impervious to air. The mounting of the cover 16 to the housing 12 is preferably designed to provide a substantially airtight seal when closed. As will be discussed in more detail below, the airtight seal allows a vacuum to be generated within the outer vessel 14.

Figure 2:
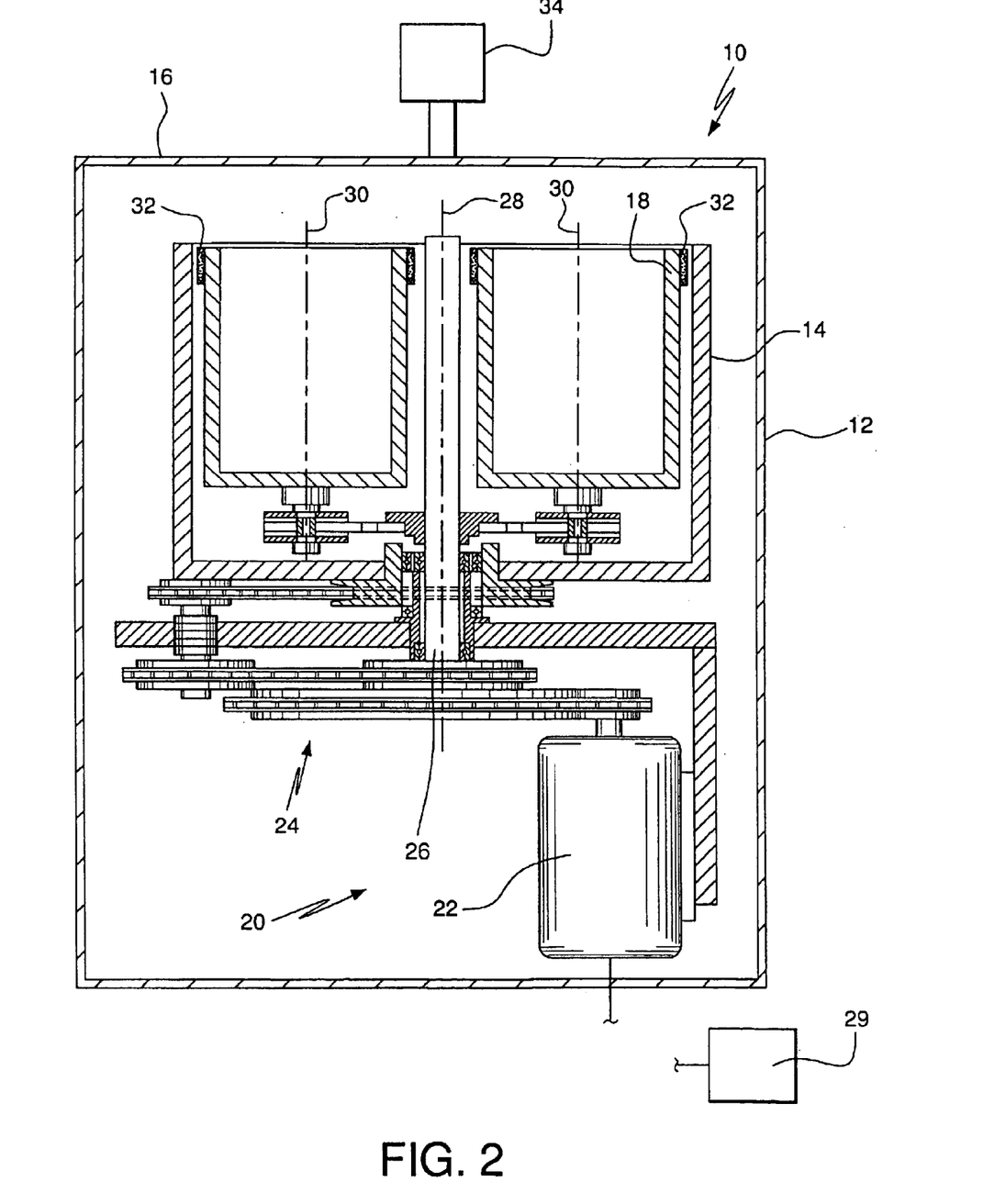
FIG. 2 is a cross-sectional view of the apparatus of FIG. 1.

One or more inner vessels 18 are adapted to be placed within the outer vessel 14. Each inner vessel 18 is adapted to contain objects to be subjected to a welding process according to the present invention. As shown in FIG. 2, the inner vessel 18 is mounted to a drive system 20 which includes a motor 22 and a transmission or gearbox 24. In the illustrated embodiment, the gearbox 24 includes a plurality of gears or pulleys. Any conventional motor 20 and suitable gearing arrangement can be used in the present invention.

As shown in one embodiment of the invention there are four inner vessels mounted to a common drive shaft 26. The drive shaft 26 is engaged with the gearbox 24 so as to be rotatably driven by the motor 22. The drive shaft 26 is adapted to rotate the inner vessels 18 around the inside periphery of the outer vessel 14 (which happens to be around the outer vessel's central axis 28 when the outer vessel is cylindrical as shown in FIG. 2.) As discussed in more detail in U.S. Pat. No. 5,355,638, the mounting of each inner vessel 18 to the drive shaft 26 is such that the inner vessel 18 can rotate about its own central axis 30 while concomitantly being driven around the inner surface of the outer vessel 14.

A controller 29, such as a signal processor, electronic or digital controller or other type of motor control, is used to control the speed and direction of rotation of the motor and/or control the engagement, shifting or disengagement of the gearbox. Controllers are well known to those skilled in the art and, therefore, no further discussion is needed.

A traction surface 32 is located between an outside surface of the inner vessel 18 and an inside surface of the outer vessel 14. The traction surface 32 can be mounted on the inner vessel 18 (as shown) or, alternately, mounted to the outer vessel 14. The traction surface 32 provides a frictional interface between the inner vessel 18 and the outer vessel 14, such that rotation of the inner vessel 18 about the outer vessel's inner periphery produces rotation of the inner vessel 18 about its central axis 30. That is, as the drive system transitions the inner vessel 18 around the inside surface of the outer vessel 14, the friction of the traction surface 32 causes the inner vessel to rotate about its axis 30. As such, the objects contained within the inner vessel 18 are subjected to both centrifugal and rotational forces. The general details of the operation of the apparatus of this first embodiment are contained in U.S. Pat. No. 5,355,638. Thus no further discussion is necessary.

It has been determined that welding or bonding of many materials is inhibited by the existence of an oxide layer on one or both materials. For example, the oxide layer on the surface of iron tends to inhibit that material from bonding with copper. Prior art devices (i.e., processes which subject the material to pressure and temperature) achieve welding by stretching the oxide layer (due to thermal expansion), thus creating voids which allow the underlying materials to weld to one another. The present invention achieves bonding of the materials by removing the oxide layer. This is accomplished by subjecting the materials to abrasive media in combination with centrifugal and rotational motion as disclosed, for example, in U.S. Pat. Nos. 5,355,638 and 5,848,929. However, under normal polishing operations the material within the vessel is exposed to air. As such, the oxide layer will typically reform.

In order to prevent the oxide layer from reforming, the present invention subjects the materials being processed to a vacuum. More particularly and as discussed above, the housing 12 and cover 16 provide a substantially air-tight seal. A vacuum or negative pressure source 34 is attached to the housing 12. The vacuum source 34 is adapted when activated to remove air from within the housing 12, thus creating a substantial vacuum within the housing 12. The inner vessels 18 either are completely open or have openings formed in them such that the objects that are being subjected to the centrifugal and rotational forces are also subjected to the negative or vacuum pressure. The vacuum can be drawn within the housing 12 either before the apparatus is in operation or after rotation has begun. Various types of conventional vacuum sources can be used in the present invention.

The amount of vacuum drawn on the vessel should be sufficient to prevent formation of the oxide layer on the material during the processing operation. It is also contemplated that, instead of drawing a vacuum on the materials, the process can be conducted in an environment filled within a gas that inhibits oxidation, such as argon or hydrogen gas. The use of a vacuum, however, is preferred since it permits a longer period of time for the materials to bond.

As shown in FIG. 2, the housing 12 preferably surrounds the outer vessel 14, as well as the drive system 20. As such, the entire centrifugal device is subjected to the negative pressure, thus limiting concerns for leakage. It is also contemplated that the drive system 20 can be located external to the housing 12. In such an alternate configuration, seals would be necessary between the drive system 20 and the internal driven components.

Figure 8:
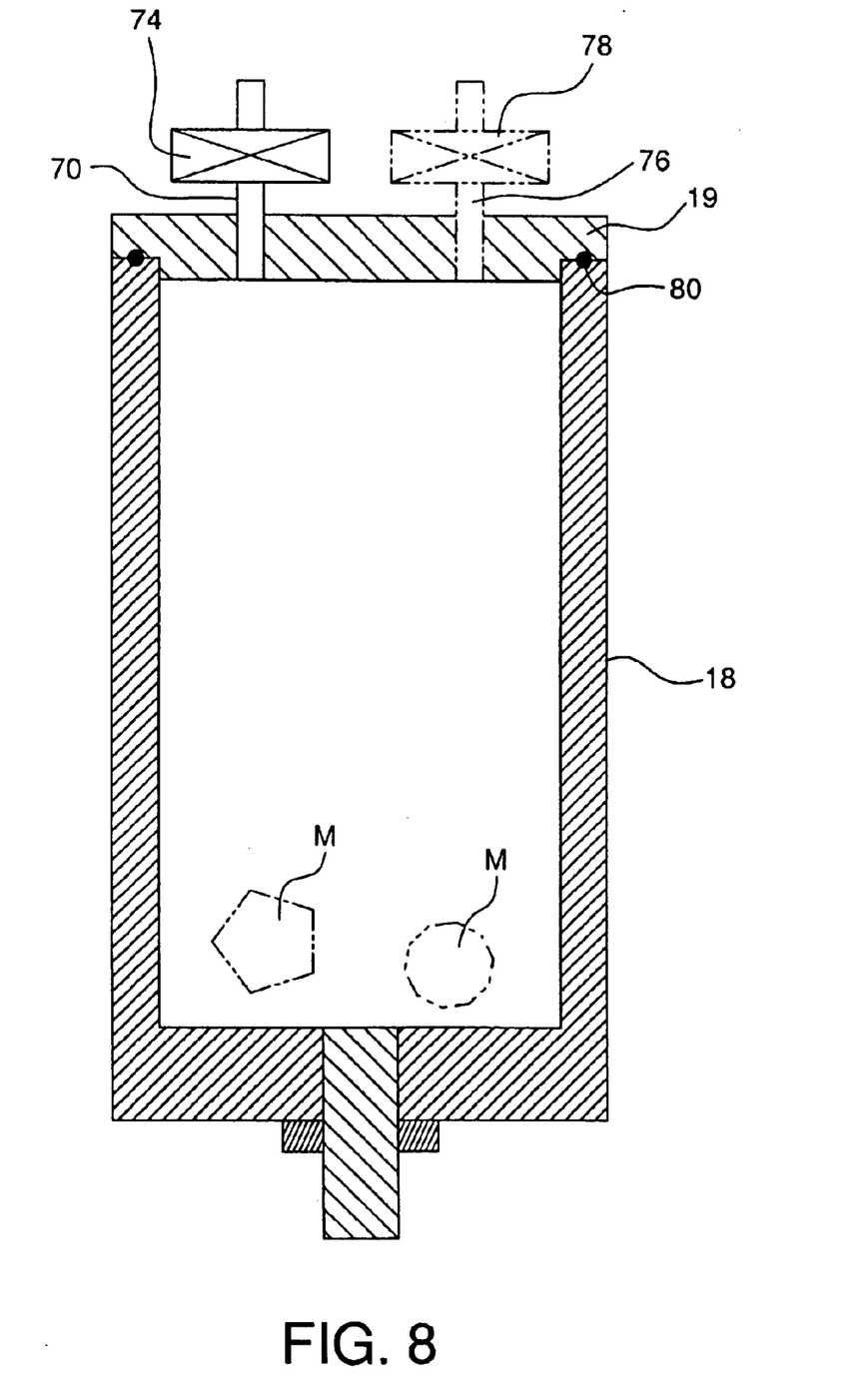
FIG. 8 is a cross-sectional view of one embodiment of the inner vessel.

It is further contemplated that, instead of mounting the outer vessel 14 within the vacuum housing 12, the inner vessels 18 could be designed so that each inner vessel could be individually subjected to the negative pressure (or a different negative pressure). The vacuum system in such an apparatus would need to accommodate the rotational motion of the inner vessels. Persons skilled in the art would be capable of modifying the illustrated systems to incorporate such individually pressurized vessels. One embodiment contemplated is shown in FIG. 8 which illustrates an individually pressurized inner vessel 18 within which the materials M to be bonded are contained. A vessel cover 19 overlies the top end of the vessel 18 so as to provide a good seal. A vacuum port 70 extends out of the vessel cover 19. A valve 72 is attached to the end of the vacuum port 70 and is connected with a vacuum source 34. The valve 72 controls exhausting of gas out of the vacuum port 70. Preferably the vacuum source can be disconnected from the valve, thus permitting the inner vessel to be evacuated then placed within the outer vessel. It should be readily apparent that, if a vacuum is to be drawn on the vessel and/or housing, the negative pressure would automatically seal the cover 16 of the housing 12. If an oxidation inhibiting gas is used, such as argon or hydrogen gas, a second port 76 and valve 78 (shown in phantom) can be added to permit the gas to be channeled into the inner vessel 18 from a gas source (not shown), while the oxygen inside is exhausted through the vacuum port 70. Any conventional valve 74, 78 can be used in the present invention to control the flow of air into and out of the vessel 18.

By subjecting the articles to both a vacuum and a high force, it is possible to produce welding of materials. For example, the present invention can be used to form a welded layer on top of or across the surface of a part being processed, such as forming a film layer on top of a silicon chip. Such film layers are used to dissipate heat from the chip. The present invention can be used to form a layer thick enough such that when the chip is complete, there is sufficient capacity in the layer to dissipate the heat generated during use of the chip. Examples of such layers include silicon carbide and cooper. The material would preferably be added during a prescribed phase of the processing operation, such as after the pre-welding preparation stage where the surface of the metal is abrasively polished. The present invention can also be used to form composite materials using metallics, ceramics and plastics. It is contemplated that any dispersable nonweldable medium can be bonded with a dispersable weldable medium using the present invention. The present invention can also be used to breakdown materials in order to facilitate bonding.

One benefit provided by the present invention is that the high speed motion of the apparatus will result in a substantially uniform layer of welded material forming across the surface of the article. Also, the apparatus can be used to provide a pre-weld finish on the article's surface to facilitate the welding process, and/or could be used provide a post-weld finish on the welded layer. U.S. Pat. No. 5,355,638 provides details of how the present invention can be used to surface finish an article. U.S. Pat. Nos. 5,140,783 and 5,507,685 describe finishing media and associated methods that are useful in surface finishing various articles. These patents are incorporated herein by reference in their entirety. Depending on when the finishing operation is to take place, the media would be added before or after the welding operation.

Figure 3:
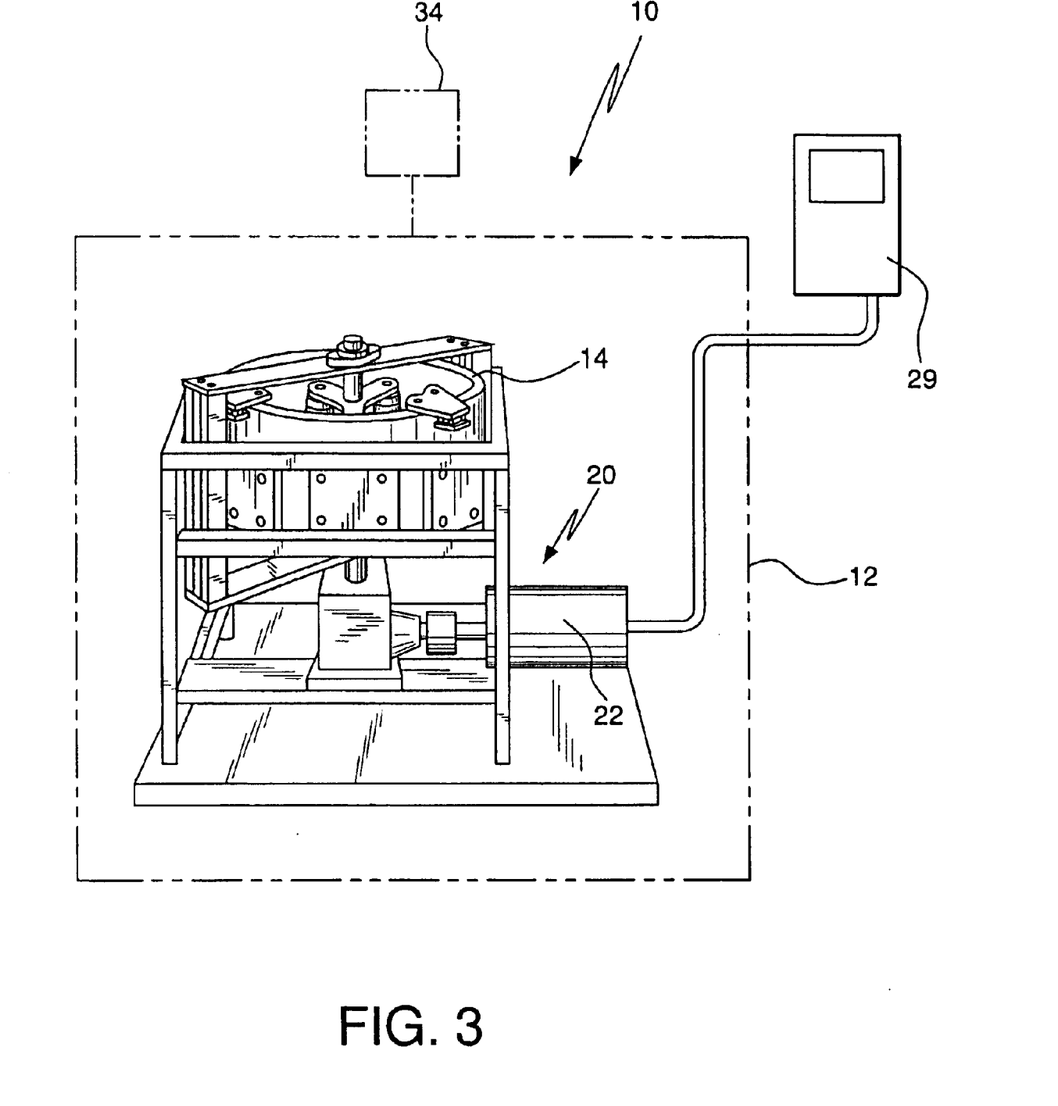
FIG. 3 is a perspective view of another embodiment of an apparatus according to the present invention which produces welding through the use of high speed centrifugal and rotational motion in a vacuum environment.
Figure 4:
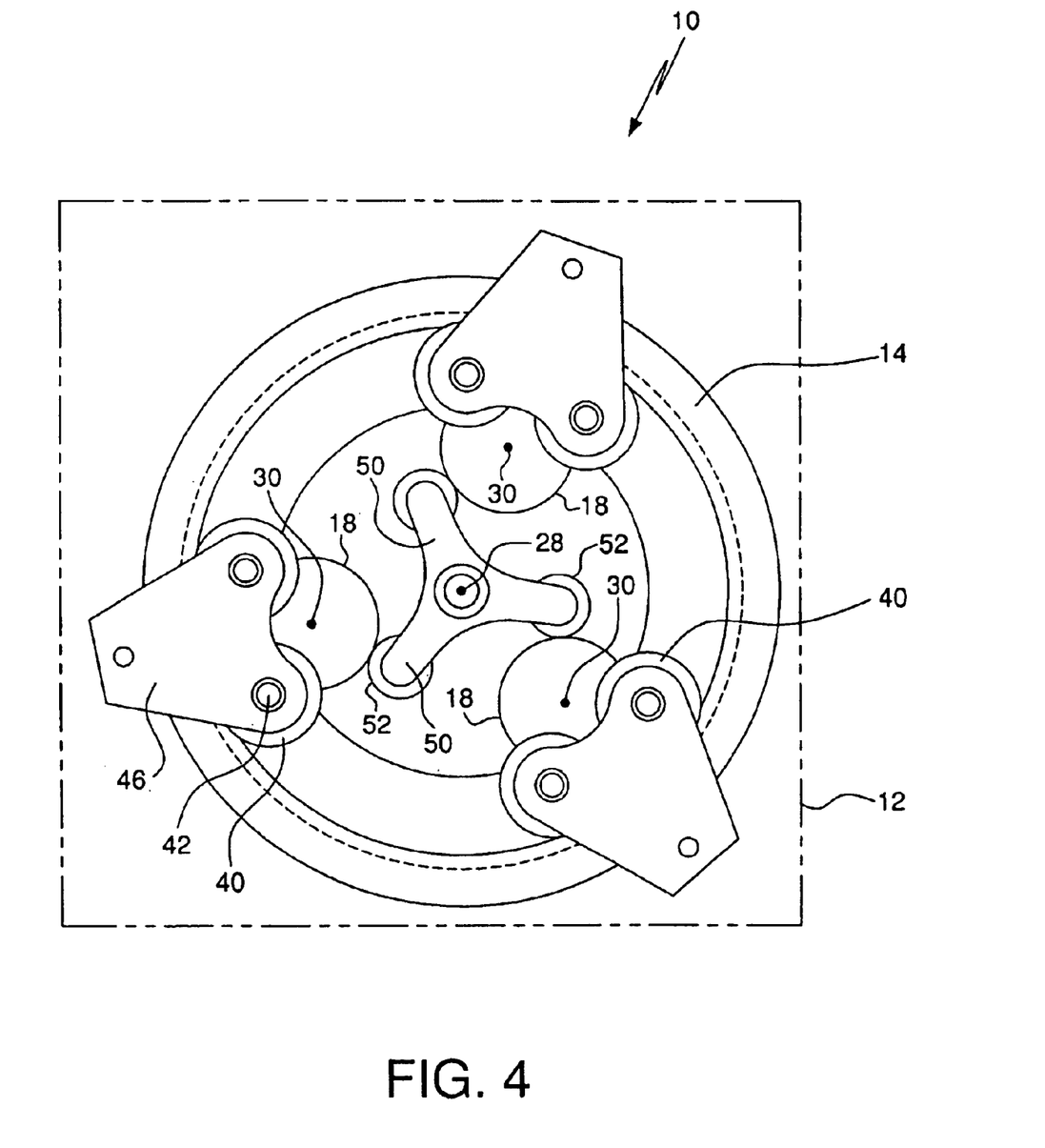
FIG. 4 is a top view of the apparatus shown in FIG. 3.
Figure 5:
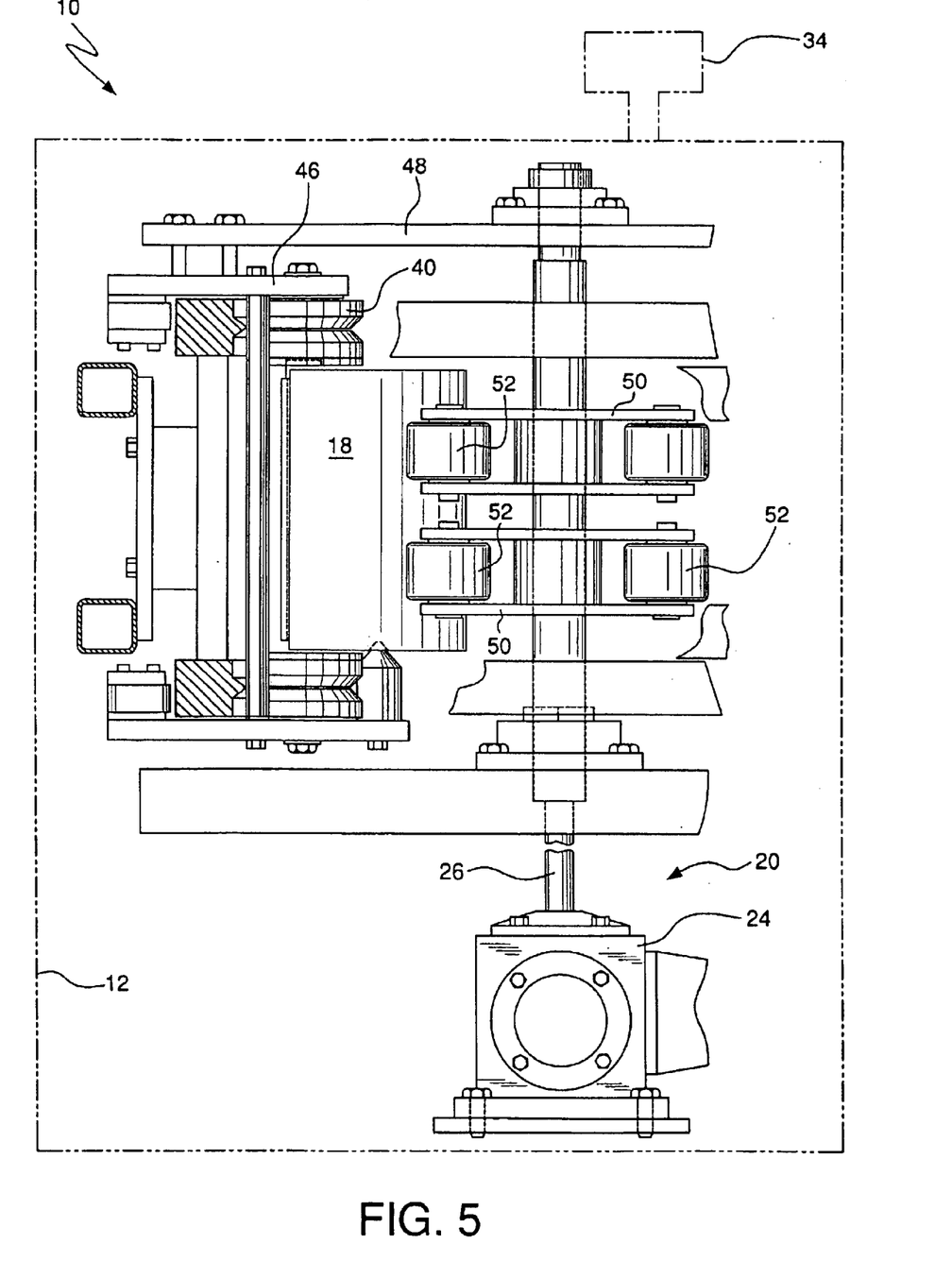
FIG. 5 is a partial side view of the apparatus shown in FIG. 3.

A second embodiment of the invention is shown in FIGS. 3, 4 and 5. In this embodiment, the centrifugal apparatus is essentially the same as the device shown in U.S. Pat. No. 5,848,929 and includes a fixed outer vessel 14, at least one inner vessel 18, and one or more intermediate rollers 40. The intermediate rollers 40 are configured to contact an inner surface of the outer vessel 14 and an outer surface of the inner vessel 18. More particularly, the intermediate roller 40 is mounted such that it can roll along the inside surface of the outer vessel 14. The inner vessel 18 is designed to contact a portion of the intermediate roller 40 such that rotary motion is transmitted between the vessel 18 and the roller 40.

As disclosed in U.S. Pat. No. 5,848,929, in one embodiment of the present invention, the intermediate roller 40 is driven around the inside surface of the outer vessel 14 by the drive system 20. As the intermediate roller 40 rolls along the inner surface of the outer vessel 14, it causes the inner vessel 18 to follow along, thus imposing, in the case of cylindrical outer vessel, centrifugal forces on the items being finished within the inner vessel 18 as the inner vessel 18 transitions around the central axis 28 of the outer vessel 14. Also, since the intermediate roller 40 rolls about its own central axis 42, it causes the inner vessel 18 to rotate about it own central axis 30, thus imparting rotational motion on the articles contained within the inner vessel 18.

In the illustrated embodiment, there are two intermediate rollers rotationally mounted to a support bracket 46. The bracket, in turn, is mounted to a cross-bar 48 which is engaged to a drive shaft 26. The drive shaft 26 is driven by a motor 22 through a transmission or gearbox 24.

The illustrated embodiment also includes three rotor arms 50 which are attached to the drive shaft 26, each arm including a drive roller 52 that is designed to contact an inner vessel 18 for urging the inner vessel 18 into contact with the intermediate rollers 40. The number of rotor arms 50 and drive rollers 52 can be varied to accommodate the number of inner vessels 18. It is also contemplated that the rotor arms 50 can be eliminated from the apparatus since normal operation of the device will urge the inner vessels into contact with the intermediate rollers 40. The drive assembly, including the rotors, is described in more detail in U.S. Pat. No. 5,848,929.

As with the prior embodiment, the present invention contemplates that the articles within the inner vessels 18 are subjected to a negative or vacuum pressure. This is achieved in substantially the same way as discussed above. That is, the entire centrifugal device 10 can be located within a room or housing (shown in phantom and identified as 12) that is attached to a vacuum source 34 such that the housing 12 can be evacuated to expose the articles to the vacuum environment. Alternatively, a vacuum source 34 can be attached to the inner vessel 18 to directly evacuate the vessel 18.

Figure 6:
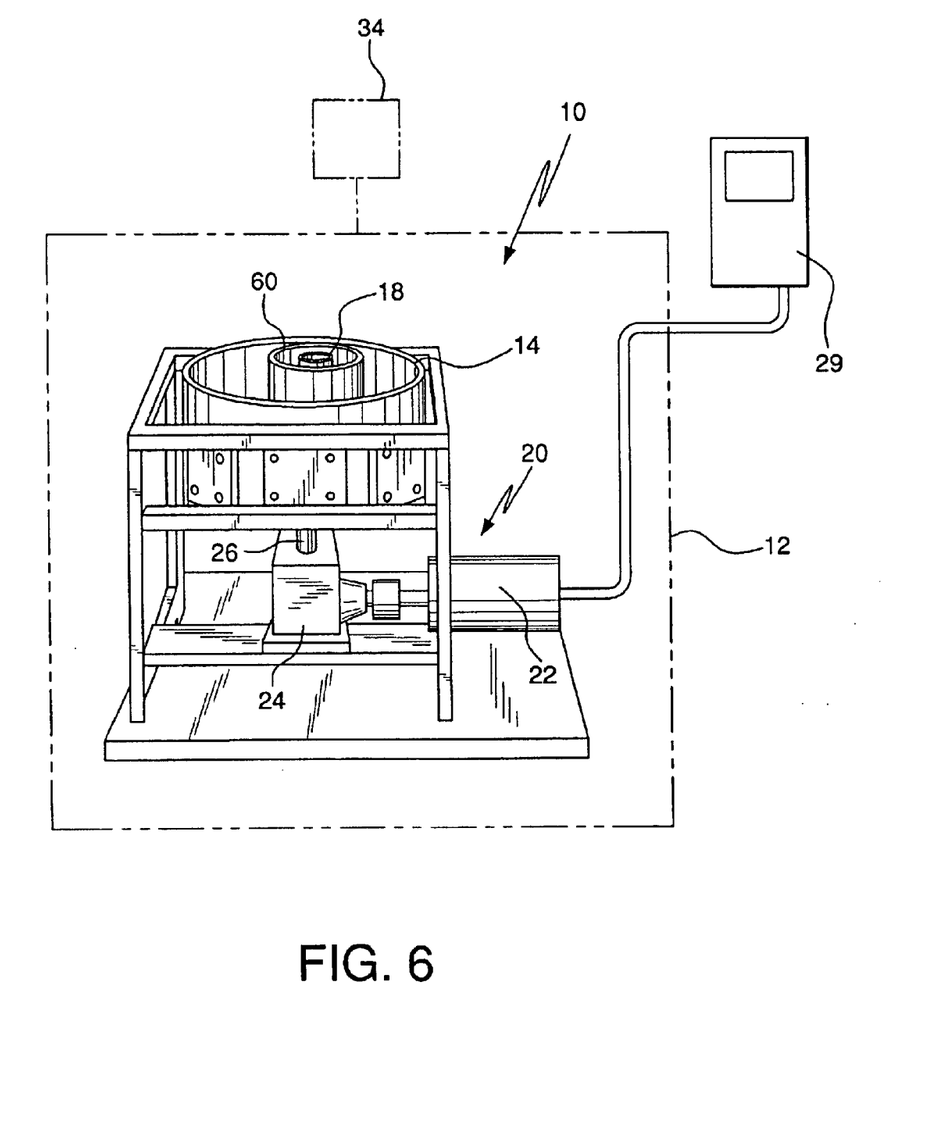
FIG. 6 is a perspective view of yet another embodiment of an apparatus according to the present invention which produces welding through the use of high speed centrifugal and rotational motion in a vacuum environment.
Figure 7:
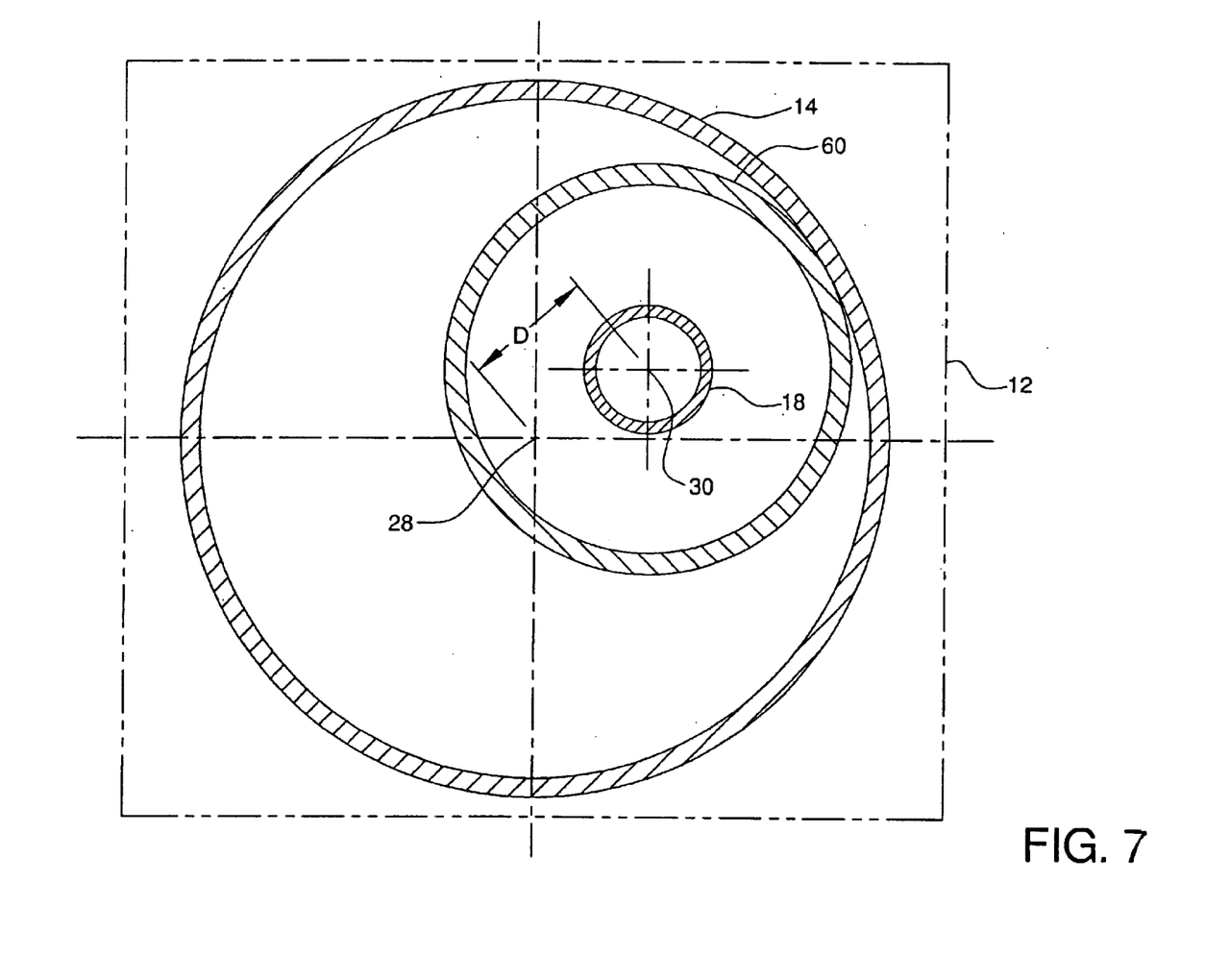
FIG. 7 is a schematic top view of the apparatus of FIG. 6.

Another embodiment of the invention is shown in FIGS. 6 and 7. This embodiment includes an outer vessel 14, preferably fixed, with an inner surface. An intermediate vessel 60 is rotatably mounted within the outer vessel 14 with its outer surface in contact with the inner surface of the outer vessel 14. An inner vessel 18 is located within, and preferably fixedly mounted to the center of, the intermediate vessel 60 so as to rotate in conjunction with the intermediate vessel 60.

As in the prior embodiments, the apparatus in this embodiment includes a drive system 20 with a motor 22 that rotatably drives a drive shaft 26 through a gearbox or transmission assembly 24. The drive shaft 26 is attached to the intermediate vessel 60.

Referring to FIG. 7, a top schematic view is shown of the embodiment of the invention illustrated in FIG. 6. The specifics of the mounting of the vessels is not shown for clarity. As discussed above, the outer vessel 14 is preferably fixed and, therefore, does not rotate, although the present invention contemplates and can be readily modified to include an outer vessel 14 that does rotate.

The intermediate vessel 60 is driven by the motor 20 about an inner surface of the outer vessel 14. In the illustrated embodiment the inner surface of the outer vessel is cylindrical in shape. As such, the intermediate vessel 60, which is also preferably cylindrical, is driven by the motor 20 around the inner circumference of the outer vessel 14 (i.e., rolls along the inner surface) and, thus, is rotated about the central axis 28 of the outer vessel 14.

While one intermediate vessel 60 is shown in the illustrated embodiment, it is contemplated the more than one intermediate vessel 60 can be used. If more than one intermediate vessel 60 is used in the present invention, its diameter must be less than the radius of the outer vessel 14.

At least one inner vessel 18 is positioned inside the intermediate vessel 60 and is adapted to contain at least one object to be finished. The inner vessel 18 is preferably fixed to the intermediate vessel 60 such that the inner vessel 18 rotates in combination with the intermediate vessel 60. It is, however, also contemplated that there may be situations where it is desirable for the inner vessel 18 to rotate on its own within the intermediate vessel 60. Since in the illustrated embodiment the inner vessel 18 is fixed to the intermediate vessel 60, its shape is not critical and may be selected so as to accommodate the objects being finished within the vessel 18.

The inner vessel 18 is mounted to or positioned within the intermediate vessel 60 at a location that is spaced apart from the central axis 28 of the outer vessel 14. In the illustrated embodiment, the distance between the central axis 30 of the inner vessel 18 and the central axis 28 of the outer vessel 14 is identified by the letter D. Preferably, the inner vessel 18 is mounted such that its central axis 30 is co-linear with the central axis of the intermediate vessel 60. If the inner vessel 18 is not located on the central axis of the intermediate vessel 60, then the inner vessel 18 should be located so that a spacing always remains between the central axis 28 of the outer vessel 14 and the central axis 30 of the inner vessel 18.

Figure 9:
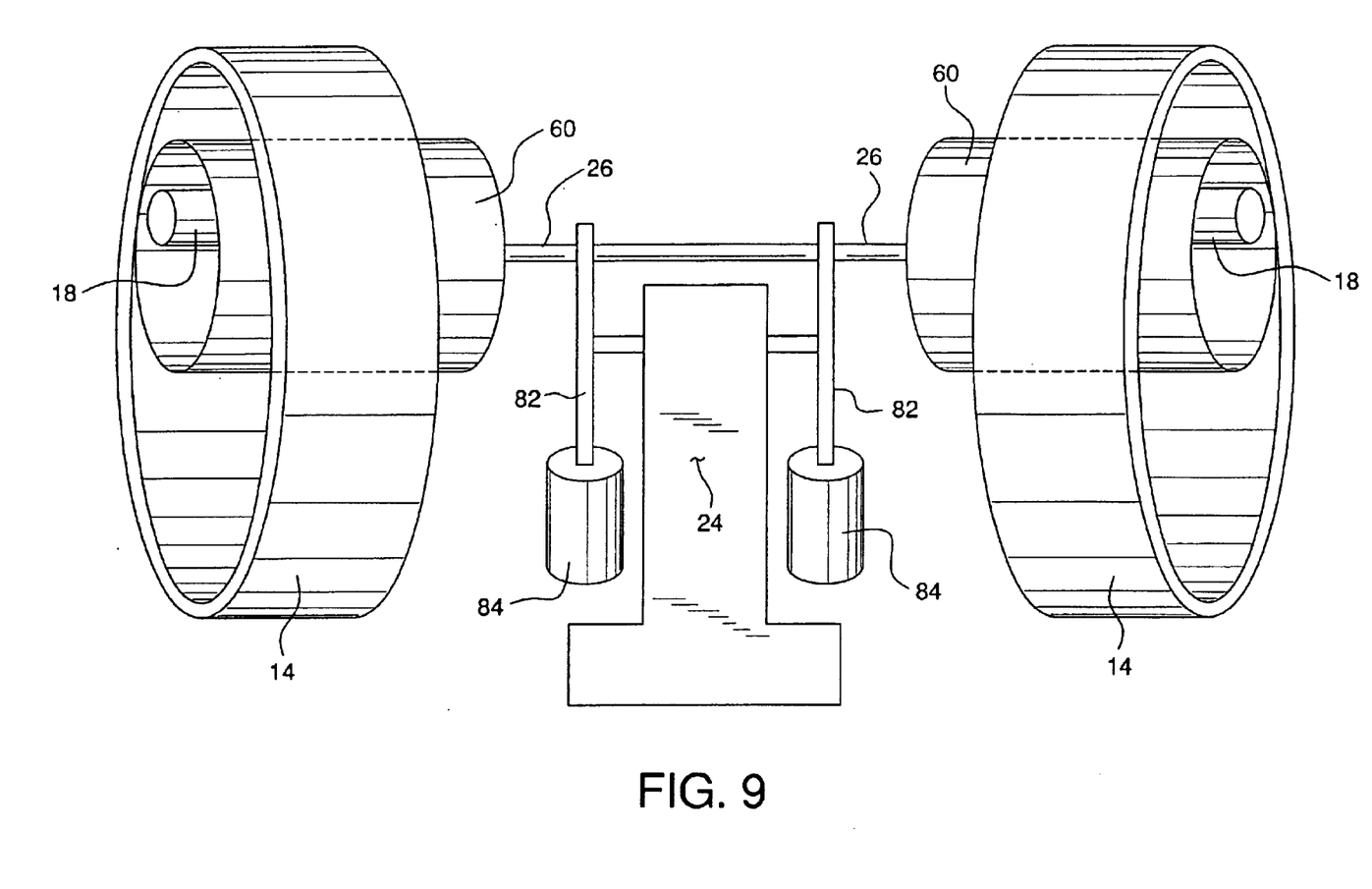
FIG. 9 is a schematic of one configuration of an apparatus according to the embodiment of the centrifugal welder shown in FIG. 6.
Figure 10:
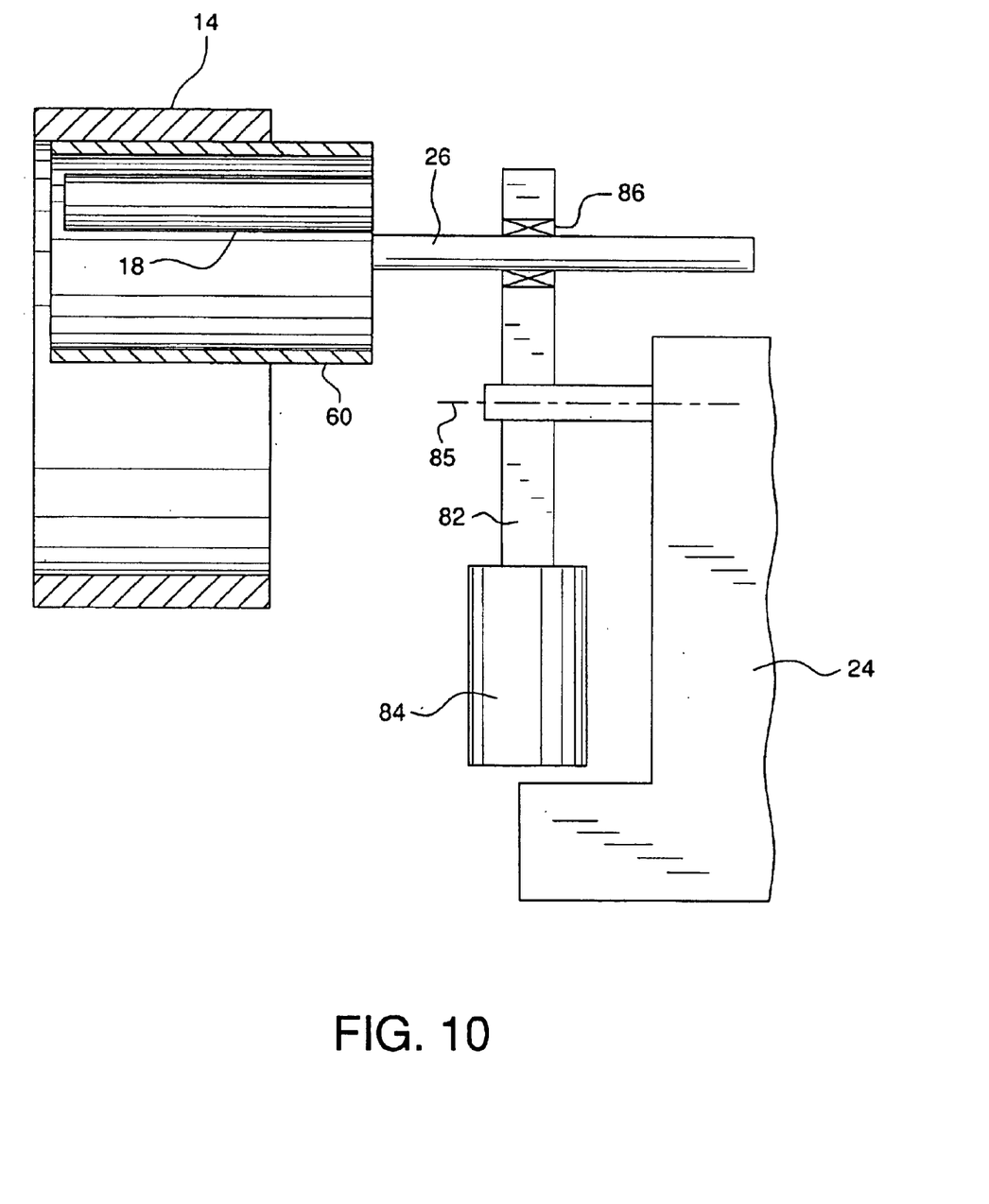
FIG. 10 is a partial cross-sectional schematic view of the configuration of an apparatus shown in FIG. 9.

Another embodiment of the high speed centrifugal device of FIGS. 6 and 7 is shown in FIGS. 9 and 10. In this embodiment, two intermediate vessels 60 are mounted to a common drive shaft 26 but are located within two separate, vertically oriented outer vessels 14. The drive shaft 26 is attached to one or more drive arms 82 which, in turn, are driven by a transmission assembly 24 (and powered by a motor, not shown). The transmission rotates the drive arm 82 about a drive axis 85.

A counterweight 84 is mounted to the opposite end of the drive arm 82 from where the drive arm attaches to the drive shaft 26. The counterweight 84 is designed to balance out the eccentric loads caused by driving the intermediate and inner vessels. The counterweight is preferably adjustable/replaceable so that the proper weights can be attached to accommodate the products being finished.

Bearings 86 are preferably located between the drive shaft 26 and the drive arm 82 in order to permit the drive shaft 26 to rotate within the drive arm 82 as the intermediate vessel 60 is driven around the outer vessel 14.

These embodiments of the centrifugal device is discussed in more detail in co-pending application entitled "High Speed Centrifugal Processor", filed concurrently herewith, which is incorporated herein by references in its entirety. As discussed in that application, the spacing D between the central axis of the outer vessel 14 and the central axis of the inner vessel 18, in combination with the rotation of the intermediate vessel 60, induces high centrifugal and rotational forces on objects placed within the inner vessel 18.

As with the embodiments discussed above, the centrifugal apparatus 10 in this embodiment is preferably mounted within a housing 12 which allows a vacuum to be generated within the inner vessel 18. Alternately, the vacuum source 34 can be attached to the inner vessel for directly generating a vacuum inside the inner vessel 18.

In order to accommodate the high loading attendant to the present invention, the vessels should preferably be made from high strength material, such as steel. The drive system (i.e., motor 22, drive shaft 26 and transmission 24) must also be designed to accommodate the anticipated high loads. Those skilled in the art would be readily capable for selecting the appropriate materials and components to support the anticipated speeds and loads associated with the present invention.

The high speeds produced by the present invention impose significant forces on objects contained within the inner vessel 18. It is anticipated that loads as high as 300 g's can be attained using the present invention. These loads are sufficiently high to produce welding of appropriate materials when those materials are subjected to a vacuum environment as discussed above.

The present invention may be embodied in other specific forms without departing from the spirit or essential attributes thereof and, accordingly, reference should be made to the appended claims, rather than to the foregoing specification, as indicating the scope of the invention.

What is claimed is:

1. An apparatus for performing high speed welding of materials comprising:
    an outer vessel having an inner surface and a central axis;
    at least one inner vessel positioned within the outer vessel and adapted to receive at least two objects to be subjected to a welding process;
    means for rotating the inner vessel with respect to the outer vessel; and
    a vacuum source communicating with the inner vessel, the vacuum source adapted to generate a vacuum within the inner vessel while the inner vessel is rotating relative to the outer vessel.

2. The apparatus of claim 1 further comprising a housing disposed about the outer vessel, and wherein the vacuum source is mounted to the housing and adapted to evacuate the housing.

3. The apparatus of claim 1 wherein the means for rotating the inner vessel with respect to the outer vessel includes a drive system having a rotatable drive shaft, the rotatable drive shaft being engaged with the at least one inner vessel for rotating the inner vessel about a central axis which is co-linear with a central axis of the outer vessel, and a traction surface formed between the inner vessel and the outer vessel, the traction surface providing a frictional interface which facilitates rotation of the inner vessel with respect to the outer vessel.

4. The apparatus of claim 3 further comprising a housing disposed about the outer vessel, and wherein the vacuum source is mounted to the housing and adapted to evacuate the housing.

5. The apparatus of claim 3 wherein the inner vessel has a cover, a vacuum port and a valve, and wherein the vacuum source is adapted to connect to the port on the inner vessel for evacuating the inner vessel after the two objects have been placed within the inner vessel.

6. The apparatus of claim 1 wherein the means for rotating the inner vessel with respect to the outer vessel includes
    at least one intermediate roller mounted between the at least one inner vessel and the outer vessel, the intermediate roller having a portion which is engaged with an inner surface of the outer vessel and a portion which is engaged with an outer surface of the inner vessel,
    a drive system having a rotatable drive shaft, the rotatable drive shaft being engaged with the intermediate roller for causing the roller to roll along the inner surface of the outer vessel, and
    wherein the inner vessel is rotated by the intermediate roller as the intermediate roller rolls along the inner surface of the outer vessel.

7. The apparatus of claim 6 wherein the portion of the intermediate roller that engages with the outer surface of the inner vessel has a diameter that is less than the diameter of the portion of the intermediate roller that engages with the inner surface of the outer vessel.

8. The apparatus of claim 7 further comprising a housing disposed about the outer vessel, and wherein the vacuum source is mounted to the housing and adapted to evacuate the housing.

9. The apparatus of claim 7 wherein the inner vessel has a cover, a vacuum port and a valve, and wherein the vacuum source is adapted to connect to the port on the inner vessel for evacuating the inner vessel after the two objects have been placed within the inner vessel.

10. The apparatus for claim 1 wherein the outer vessel is non-rotatable, wherein the means for rotating the inner vessel with respect to the outer vessel includes at least one intermediate vessel located within the outer vessel, the intermediate vessel having an outer surface which contacts an inner surface of the outer vessel, and a drive system engaged with the intermediate vessel and adapted to roll the intermediate vessel along the inner surface of the outer vessel, and wherein the inner vessel is mounted within the intermediate vessel and has a central axis, the inner vessel being positioned within the intermediate vessel such that the central axis of the inner vessel is spaced apart from the central axis of the outer vessel.

11. The apparatus of claim 10 further comprising a housing disposed about the outer vessel, and wherein the vacuum source is mounted to the housing and adapted to evacuate the housing.

12. The apparatus of claim 10 wherein the inner vessel has a cover, a vacuum port and a valve, and wherein the vacuum source is adapted to connect to the port on the inner vessel for evacuating the inner vessel after the two objects have been placed within the inner vessel.

13. An apparatus for performing high speed welding of materials comprising:
    an outer vessel having an inner surface and a central axis;
    at least one inner vessel positioned within the outer vessel and adapted to receive at least two materials to be welded;
    means for rotating the inner vessel with respect to the outer vessel; and
    means for removal of oxygen from the inner vessel.

14. The apparatus of claim 13 wherein the means for removal of oxygen from the inner vessel is a vacuum source in communication with the inner vessel and adapted to remove oxygen from the inner vessel.

15. The apparatus of claim 14 wherein the inner vessel has a cover, a vacuum port and a valve, and wherein the vacuum source is adapted to connect to the port on the inner vessel for evacuating the inner vessel after the two objects have been placed within the inner vessel.

16. The apparatus of claim 13 wherein the means for removal of oxygen from the inner vessel includes an exhaust port and a gas supply in communication with the inner vessel, the gas supply adapted to deliver a gas into the inner vessel which forces oxygen out of the exhaust port.

17. The apparatus of claim 13 wherein the means for rotating the inner vessel with respect to the outer vessel includes
    at least one intermediate roller mounted between the at least one inner vessel and the outer vessel, the intermediate roller having a portion which is engaged with an inner surface of the outer vessel and a portion which is engaged with an outer surface of the inner vessel,
    a drive system having a rotatable drive shaft, the rotatable drive shaft being engaged with the intermediate roller for causing the roller to roll along the inner surface of the outer vessel, and
    wherein the inner vessel is rotated by the intermediate roller as the intermediate roller rolls along the inner surface of the outer vessel.

18. The apparatus of claim 17 wherein the portion of the intermediate roller that engages with the outer surface of the inner vessel has a diameter that is less than the diameter of the portion of the intermediate roller that engages with the inner surface of the outer vessel.

19. The apparatus of claim 13 wherein the means for rotating the inner vessel with respect to the outer vessel includes a drive system having a rotatable drive shaft, the rotatable drive shaft being engaged with the at least one inner vessel for rotating the inner vessel about a central axis which is co-linear with a central axis of the outer vessel, and a traction surface formed between the inner vessel and the outer vessel, the traction surface providing a frictional interface which facilitates rotation of the inner vessel with respect to the outer vessel.

20. The apparatus for claim 13 wherein the outer vessel is non-rotatable, wherein the means for rotating the inner vessel with respect to the outer vessel includes at least one intermediate vessel located within the outer vessel, the intermediate vessel having an outer surface which contacts an inner surface of the outer vessel, and a drive system engaged with the intermediate vessel and adapted to roll the intermediate vessel along the inner surface of the outer vessel, and wherein the inner vessel is mounted within the intermediate vessel and has a central axis, the inner vessel being positioned within the intermediate vessel such that the central axis of the inner vessel is spaced apart from the central axis of the outer vessel.

21. A method for bonding materials using high speed centrifugal motion comprising the steps of:
    providing an outer vessel, an inner vessel adapted to be mounted within the outer vessel, and a drive system for rotating the inner vessel relative to the outer vessel;
    placing at least two materials to be bonded together into the inner vessel;
    placing the inner vessel within the outer vessel;
    rotating the inner vessel relative to the outer vessel;
    inhibiting the formation of an oxidation layer on the materials in the inner vessel during rotation of the inner vessel; and
    allowing the materials to come into contact with one another.

22. The method of claim 21 further comprising the step of removing an oxidation layer from at least a portion of the materials in the inner vessel.

23. The method of claim 22 wherein the step of removing an oxidation layer involves subjecting the materials within the inner vessel to a surface finishing process which uses abrasive media to remove the oxide layer from the surface of at least a portion of the materials.

24. The method of claim 23 wherein the step of inhibiting the formation of an oxidation layer involves filling the inner vessel with a gas which inhibits the formation of an oxidation layer before the step of removing the oxidation layer.

25. The method of claim 23 wherein the step of inhibiting the formation of an oxidation layer involves evacuating air out of the inner vessel before the step of removing the oxidation layer.

26. A method for bonding materials using high speed centrifugal motion comprising the steps of:
    providing an outer vessel, an inner vessel adapted to be mounted within the outer vessel, and a drive system for rotating the inner vessel relative to the outer vessel;
    placing at least two materials to be bonded together into the inner vessel;
    creating a vacuum within the inner vessel;
    placing the inner vessel within the outer vessel;
    rotating the inner vessel relative to the outer vessel; and
    allowing the materials to come into contact with one another.

* * * * *